United States Patent [19]

Link et al.

[11] Patent Number: 4,640,158

[45] Date of Patent: Feb. 3, 1987

[54] MULTIPLE-SPINDLE AUTOMATIC LATHE

[75] Inventors: Helmut F. Link, Aichwald; Günther Trautmann, Kirchheim-Nabern; Albert Herrscher, Plochingen, all of Fed. Rep. of Germany

[73] Assignee: Index Werke Komm.-Ges. Hahn & Tessky, Esslingen, Fed. Rep. of Germany

[21] Appl. No.: 721,115

[22] PCT Filed: Aug. 4, 1984

[86] PCT No.: PCT/EP84/00236

§ 371 Date: Apr. 3, 1985

§ 102(e) Date: Apr. 3, 1985

[87] PCT Pub. No.: WO85/00770

PCT Pub. Date: Feb. 28, 1985

[30] Foreign Application Priority Data

Aug. 6, 1983 [DE] Fed. Rep. of Germany ....... 3328496

[51] Int. Cl.[4] .............................................. B23B 9/00
[52] U.S. Cl. .......................................... 82/3; 82/2 B; 82/28 R
[58] Field of Search ....................... 82/3, 2 B, 30, 28 R

[56] References Cited

U.S. PATENT DOCUMENTS

| | | | |
|---|---|---|---|
| 3,792,633 | 2/1974 | Filipieu et al. ............................. | 82/3 |
| 3,946,298 | 3/1976 | van de Loo .......................... | 318/685 |
| 4,133,230 | 1/1979 | Inaba et al. .......................... | 82/28 R |
| 4,158,319 | 6/1979 | Blockley et al. ...................... | 82/2 B |
| 4,185,366 | 1/1980 | Gilbert ..................................... | 82/3 |
| 4,250,775 | 2/1981 | Jerue et al. ............................ | 82/2 B |

FOREIGN PATENT DOCUMENTS

| | | |
|---|---|---|
| 2457477 | 6/1975 | Fed. Rep. of Germany . |
| 2443087 | 7/1975 | Fed. Rep. of Germany . |
| 1486422 | 9/1977 | United Kingdom . |

OTHER PUBLICATIONS

CNC—Steuerung, fur ein mehrspindliges Drehbearbeitungszentrum Von Prol. Dr. Ing. G. Spur und Dr.—Ing. H. Mathes, Berlin ZwF76 (1981), pp. 24–27.

Primary Examiner—Lowell A. Larson
Assistant Examiner—Jerry Kearns
Attorney, Agent, or Firm—Neuman, Williams, Anderson & Olson

[57] ABSTRACT

The invention relates to a multiple-spindle automatic lathe with several work spindles. In accordance with the invention, each of the work spindles comprises an associated electric motor. Associated with the electric motors are supply devices with at least one stationary means fed from an external voltage source and at least one rotatable means cooperating therewith. Also provided are speed and position control devices comprising per work spindle one rotary angular position detector means each for absolute value angle coding including a detector rotating synchronously with the work spindle and a stationary sensor means.

12 Claims, 7 Drawing Figures

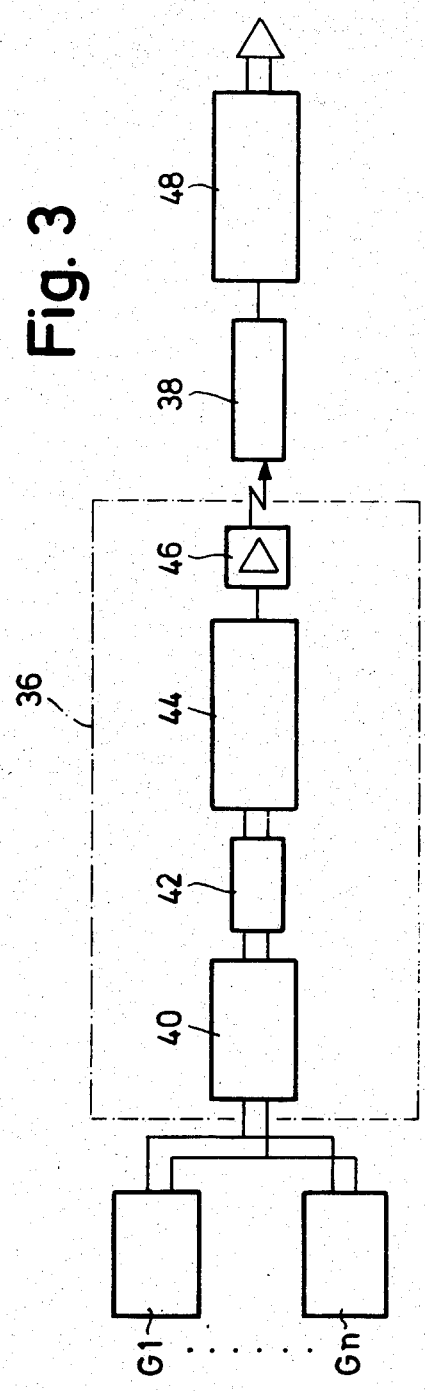
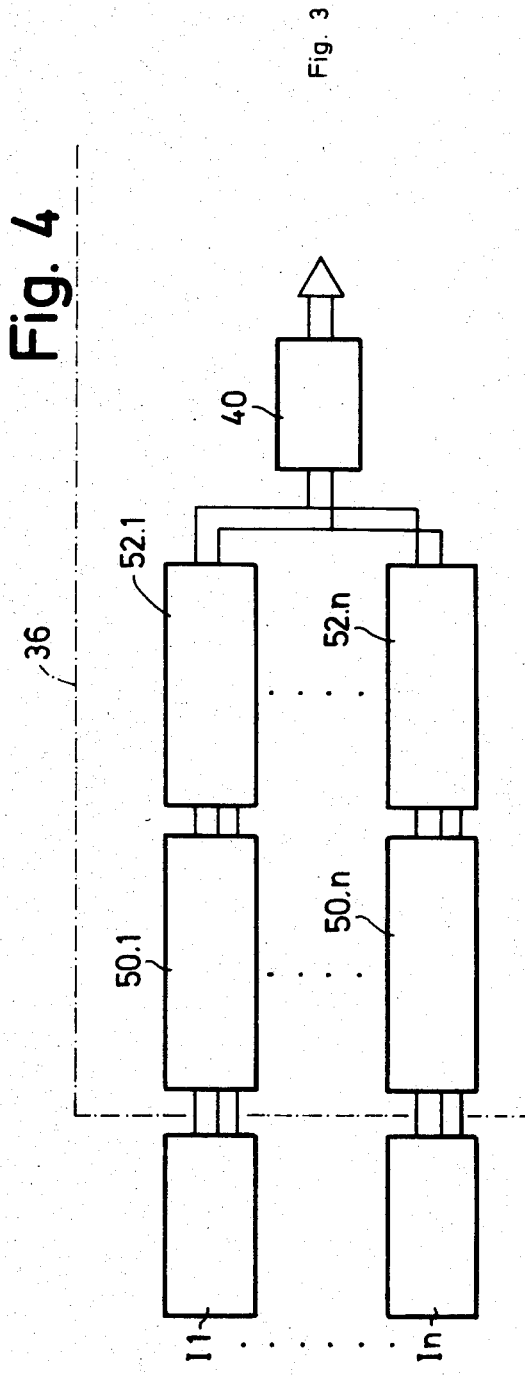

MULTIPLE-SPINDLE AUTOMATIC LATHE

The invention relates to a multiple-spindle automatic lathe with a spindle drum indexable by a spindle drum drive relative to a stationary machine frame step-wise into a number of indexing positions corresponding to the number of work spindles, in which spindle drum the work spindles are rotatably mounted, with one individually controllable electric motor per work spindle, with supply devices for the electric motors and with control devices to control the speed of the electric motors.

Such a multiple-spindle automatic lathe is described in German Pat. No. 1 265 539. In the known automatic lathe, each of the electric motors associated with one work spindle or workpiece spindle, respectively, is attached to the inside of an attachment drum which is a component of the spindle drum. The spindles and the motor shafts are, furthermore, each provided with V-belt pulleys over which a V-belt connecting the motor to the associated spindle runs.

A disadvantage of the known multiple-spindle automatic lathe is the large space requirement for the attachment drum and the electric motors which are arranged radially outside of the work spindle relative to the axis of rotation of the spindle drum. The drive via driving belts is also relatively loud and involves high maintenance and repair expenditure in view of the fact that driving belts are distinctively subject to wear and tear.

Also known from the German publication ZwF 76 (1981) 1 pages 24 to 27 is a multiple-spindle automatic lathe of the generic kind mentioned at the outset, wherein the individual work spindles each include an angle with the axis of rotation of a spindle drum of spindle-nose-type configuration, wherein there may be associated with each work spindle an individually controllable electric motor which is attached to the machine frame and, as described in detail in German laid open patent application No. 2 338 207, may be coupled via an axially displaceable coupling with the pertinent work spindle and released therefrom.

A disadvantage of this solution is that during the indexing of the spindle nose or the drum, the speed of the spindles cannot be controlled, and substantial frictional heat losses occur in the couplings, resulting in the automatic lathe being unnecessarily heated up, as is also the case in multiple-spindle automatic lathes having for all of the work spindles one common drive serving to drive the spindles via couplings associated individually with the spindles (see German laid open patent application No. 2 443 087).

Unfavorable acceleration moments which shorten the service life of the machine and, in the end, limit the operating speed of the automatic lathe also occur in the known multiple-spindle automatic lathes comprising coupling devices between the work spindles and the drive means during the indexing of the spindle drum on account of the changes in speed of the work spindle involved therein.

Departing from the state of the art, the object underlying the invention is to improve a multiple-spindle automatic lathe of the kind mentioned at the outset so as to obtain high service life with high operating efficiency and high precision during trouble-free operation.

This object is attained in the multiple-spindle automatic lathe of the kind mentioned at the outset, in accordance with the invention, in that each of the work spindles directly comprises the shaft of the associated electric motor, in that all of the electric motors are fed via slip ring means on a portion of the shaft of the spindle drum and via brush means which are attached to the machine frame adjacent to the slip ring means, and in that the control devices constitute part of speed and position control devices comprising per work spindle one rotary angular position detector means each for absolute value angle coding, which includes a detector rotating synchronously with the associated work spindle and a sensor means arranged stationarily relative thereto.

An important advantage of the automatic lathe according to the invention is that due to the work spindles directly comprising the shaft of the associated electric motor, or being formed by the motor shaft, a very compact design of the spindle drum arrangement is obtainable, which results in an overall reduction of the space requirement for the automatic lathe compared with the known construction described at the outset. The mass of the spindle drum arrangement is also simultaneously reduced, so that it can be indexed at a higher speed. The feeding of the electric motors via brush means and slip rings even during the drum indexing procedures, in accordance with the invention, furthermore, also ensures unproblematic supplying of energy to the electric motors, so that the speed of the electric motors may be controlled, i.e., increased or decreased during the indexing procedures. This firstly results in the advantage that the time required for indexing the drum may be used to bring about the necessary changes in the speed of the individual work spindles, so that they can already reach the new indexing position of the drum with the speed desired in the new indexing position, which, in the end, enables immediate continuation of work with the spindles after a brief re-adjustment of the speed and position with the aid of the rotary angular position detector means which is then effective again. Furthermore, in the event of it being necessary to brake an electric motor during the indexing procedures, energy may also be fed back from the motor, in this case, operating as a generator, on account of the continuously existing electric connections, which results in a further reduction of the loss heat occurring in the automatic lathe, which, for many reasons, is desired and advantageous.

In addition, precise speed and position control is made possible for each of the electric motors by having an absolute value angle coding associated with it. In this respect, too, the inventive automatic lathe differs advantageously from the known multiple-spindle automatic lathe, wherein on account of the limited possibilities of speed control for the individual electric motors, the belt drive allows selection of one of several transmission ratios.

With the inventive design of the supply devices for the electric motors, wherein the slip ring means are preferably arranged at the rear end of the shaft of the spindle drum, i.e., behind the end of the work spindles remote from the operating area, the slip ring and brush means are easily accessible as structural unit for the performance of maintenance and repair work.

It has also proven particularly expedient for the sensor means of the individual rotary angular position detector means not to be attached to the machine frame, but to the spindle drum, and to be coupled with associated evaluating devices by means of transmission devices which are arranged on the shaft of the spindle drum and include a transmitting unit rotating with the spindle drum and a receiving unit attached to the machine frame. It is particularly advantageous for the transmitting unit to be arranged at the one end of the shaft of the spindle drum, and to comprise a signal output located on the axis of the spindle drum, and for the receiving unit to be in the form of a receiving unit which operates in a contact-less manner. For, with this construction, the signal output of the transmitting unit, in spite of the fact that the latter likewise rotates or is indexed, like the sensor means, with the spindle drum, assumes a quasi-stationary position whose output signals may be received in a contact-less manner by a receiving unit secured stationarily to the machine frame, with the output signals preferably being light signals which may be received by an optical receiving unit. The light signals may lie within the visible range or also in the invisible range, for example, in the infrared range. The transmitting unit may also be designed such as to generate acoustic signals, in particular, ultrasonic signals, which may be received by an appropriate receiving unit.

If required, the transmitting unit may also generate signals in the form of changing magnetic fields whose changes are detected by the correspondingly designed receiving unit.

Although it is, in principle, possible to process the signals delivered by the individual sensor means differently in the transmitting unit, so that they can be differentiated * by the receiving unit, it is generally advantageous for the transmitting unit to include a parallel/-serial converter with which the data delivered by the rotary angular position detector means in bit-parallel form are converted into a serial form, to then be converted again in the receiving unit into bit-parallel data. The amounts of data occurring may readily be handled in real time processing in view of the high operating speed of the electronic components available today.
*distinguished To synchronize the data flow through the transmission devices, it is, furthermore, generally advantageous to provide on both the transmitting side and the receiving side one buffer store each, in which the data originating from an angle coder may be filed for a short time or stored temporarily. Also to be provided on the transmitting side is a switch-over logic or a multiplexer via which the calling-up of the data from the individual angle coders is controllable at a predetermined scanning frequency.

In a multiple-spindle automatic lathe according to the invention, it is advantageous for the rotary angular position detector means to comprise as rotating detector a coding disc and as sensor means several sensors associated with the individual tracks of the coding disc. In accordance with a further advantageous embodiment of the invention, the rotary angular position detector means may, however, also comprise as rotating detector a pulse disc with at least two increment mark tracks offset with respect to one another and with a zero mark, with the sensor means then comprising sensors to detect the increment marks and the zero mark. In this case, the sensor means also comprises a pulse-shaping circuit which can identify whether the increment mark ring is moving in a forward or rearward direction and which also detects the zero mark signals and generates in dependence upon these signals a corresponding output pulse sequence, a directional signal and a resetting signal for a upward/downward counter which counts the output pulses of the pulse-shaping circuit, with its counting direction being determined by the directional signal and it being reset to the zero count in dependence upon the zero mark signal, so that even during longer operating times, step errors cannot add up. The increment marks are preferably single teeth whose sides are detected, so that pulse multiplication occurs during scanning of the sides.

Further details and advantages of the invention will now be explained in greater detail with reference to drawings and/or constitute the subject matter of subclaims.

FIG. 3 is a block circuit diagram of a first preferred embodiment of the main parts of the speed and position control devices of a multiple spindle automatic lathe according to the invention;

FIG. 4 is a block circuit diagram of a second preferred embodiment of the main parts of the speed and position control devices of a multiple spindle automatic lathe according to the invention;

Figure 1:
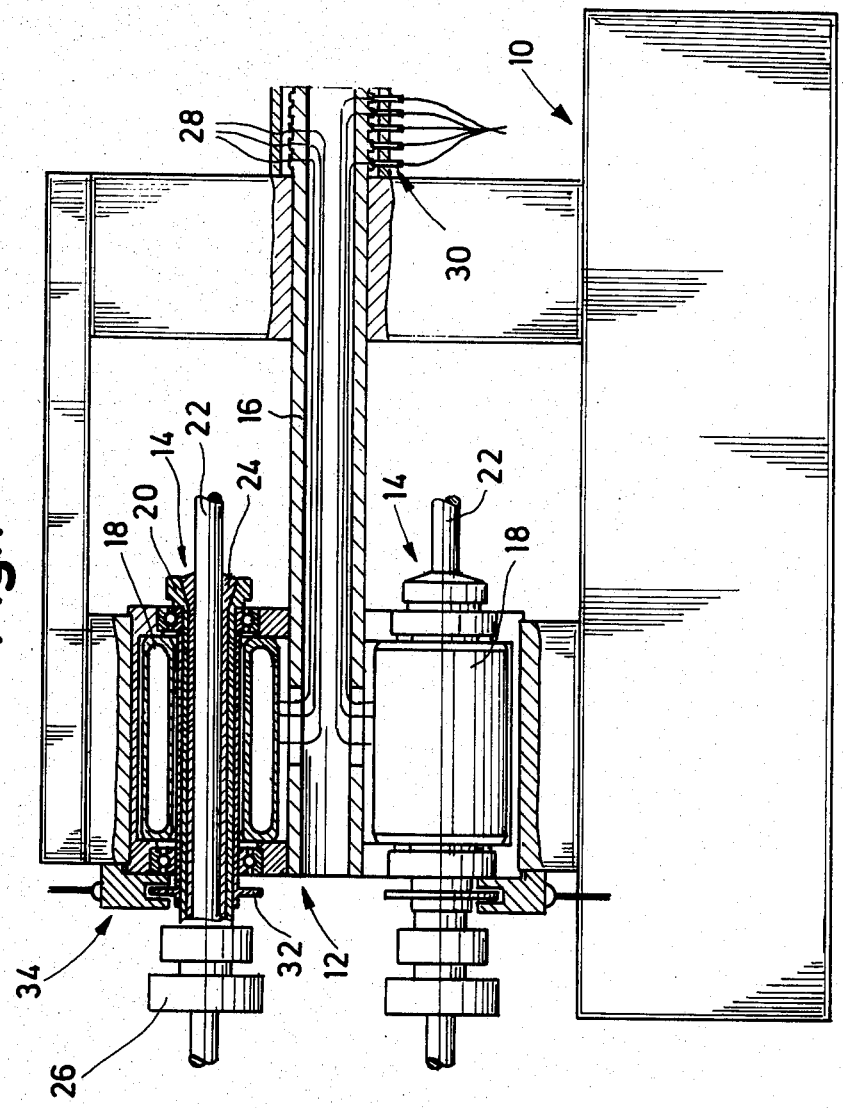
FIG. 1 is a schematic side view of a multiple spindle automatic lathe according to the invention, wherein some parts are broken away and others are shown in a sectional illustration.

FIG. 1 shows in detail a multiple spindle automatic lathe with a machine frame 10, in which a spindle drum 12 with several work spindles 14 and with a shaft 16 is rotatably mounted. The spindle drum 12 may be indexed stepwise into various indexing positions in the conventional manner by associated drive means (not illustrated). The individual work spindles 14 are each drivable by an individually associated electric motor 18 whose shaft 20 is in the form of a hollow shaft which constitutes part of the associated work spindle 14. In other words, the shaft of one of the electric motors 18 simultaneously constitutes the associated work spindle 14, which does, however, additionally include a conventional clamping fixture for clamping the rod-shaped workpiece 22. In the embodiment, the clamping fixture, in turn, comprises a clamping tube 24 with a conical end—at the right in FIG. 1—which is actuatable with the aid of a clamping cylinder 26. Each electric motor 18 comprises a stator with a winding supplied with a supply current and a rotor in the form of a permanently magnetic rotor or a squirrel-cage rotor. In accordance with the invention, controllable three-phase motors in the form of synchronous or asynchronous motors are preferably used as electric motors for the work spindles, since controllable d.c. motors have the disadvantage of comprising commutators which are subject to wear and tear.

Figure 2:
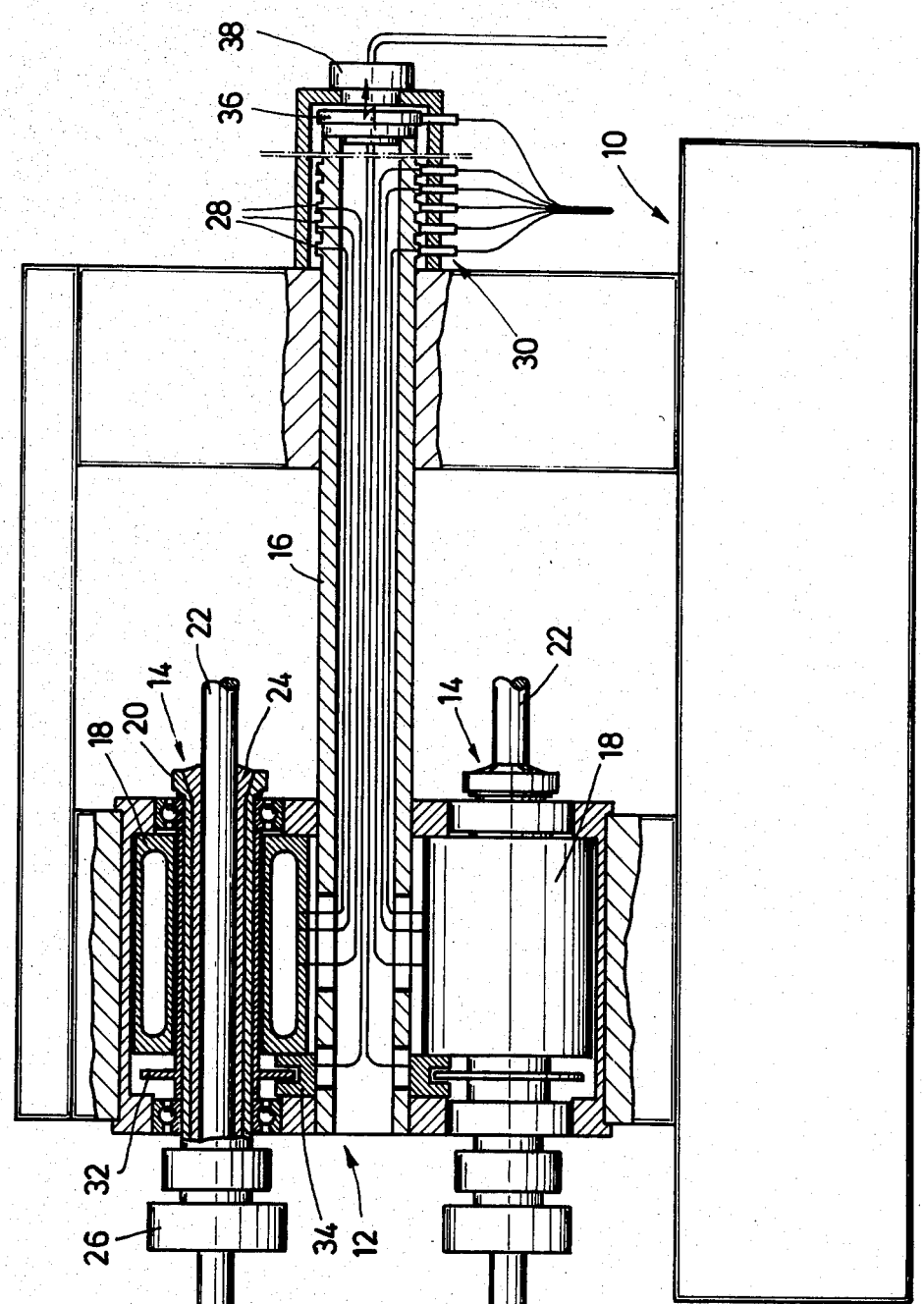
FIG. 2 is a schematic side view of a modified embodiment of a multiple spindle automatic lathe according to the invention, wherein some parts are broken away and others are shown in a sectional illustration.

In the embodiment according to FIGS. 1 and 2, the stator windings of each of the motors 18 are fed via slip rings 28 which are arranged at the rear—in FIGS. 1 and 2 right—shaft end of the shaft 16 of the spindle drum 12 and cooperate there with brush means 30 which are attached to the machine frame 10. The leads between the slip rings and the stator windings of the electric motors 18 run through the hollow shaft of the spindle drum 12. As is apparent, the arrangement of the slip rings and the brush means at the end of the spindle drum 12 remote from the work spindles 14 has the advantage that this component group combines to form a unit which is easily accessible for maintenance and repair work.

As is apparent from FIG. 1, there is also associated with each of the work spindles 14 a rotary angular position detector means comprised of a rotary angular position detector 32 rotating with the work spindle 14 and an associated sensor means 34. The sensor means 34 are secured in the positions corresponding to the various indexing positions of the spindle drum 12.

The above-described arrangement of the brush means 30 and the sensor means 34 on the machine frame 10 ensures that also during indexing of the spindle drum 12 there is always a supply current available for each motor 18, so that depending on requirements, the motor speed may also be changed during the indexing procedures, as was explained at the outset. At the end of an indexing procedure, a sensor means 34 is then again available for each detector 32, so that speed and position control may now also be effected again for the electric motors 18 only controllable during the indexing, after they they have reached the new switch position.

Altogether, small dimensions and a correspondingly low weight of the spindle drum 12 are realizable with the above-described design of the multiple spindle automatic lathe according to the invention, since the diameter of the spindle drum 12 is practically only determined by the diameter of its shaft 16 and the diameter of the motors 18.

From a purely structural point of view, the inventive multiple spindle automatic lathe shown in FIG. 2 is of essentially the same design as the automatic lathe according to FIG. 1. The essential difference between the two embodiments is that in the exemplary embodiment according to FIG. 2, also the sensor means 34 are rigidly connected to the spindle drum 12, more particularly, to the front end of the shaft 16 of the spindle drum. The connecting lines of the sensor means 34 run through the hollow shaft 16 to a transmitting unit 36 at the rear shaft end. The transmitting unit 36 is designed so as to comprise a signal output which is directly located on the axis of rotation of the shaft 16 and therefore assumes a quasi-stationary position although the transmitting unit 36 rotates together with the spindle drum 12. A receiving unit 38 attached to the machine frame 10 is located opposite to the transmitting unit 36 and/or to the signal output thereof so that the signals generated by the transmitting unit 36 may be received by the receiving unit 38 and passed on to associated evaluating devices.

Furthermore, the embodiment according to FIG. 2 has the advantage that the speed and position control for the individual work spindles is no longer interrupted during the drum indexing procedures, so that a work spindle may continue to work immediately after reaching the new work position.

Regarding the arrangement of the rotating detectors 32 and the associated sensor means 34, the embodiment according to FIG. 2 has the advantage that there is individually associated with each detector 32 a certain sensor means 34, so that each of the signal detector means consisting of a detector 32 and an associated sensor means 34 may be individually and very precisely adjusted, which is not possible with the embodiment according to FIG. 1, since there each detector 32 cooperates in succession with each of the sensor means 34 in accordance with the indexing of the spindle drum 12.

The design and functioning of the absolute value angle coders used in accordance with the invention will now be explained in greater detail with reference to FIGS. 3 and 4.

FIG. 3 shows in detail an embodiment wherein the individual rotary angular position detector means are in the form of absolute value detectors, wherein a coding disc is provided as rotating detector 32 on the work spindle, and wherein the sensor means comprises several sensors associated with the individual tracks of the coding disc, so that the sensor means directly delivers a bit-parallel output signal indicating in coded form the angle of rotation of the pertinent work spindle, in relation to a zero or reference position. In this case, the individual sensor means are directly connected to a switch-over logic 40 of the transmitting unit 36, whose component groups are enclosed by a dot-and-dash line in FIG. 3. The switch-over logic 40 * ensures that the individual detectors, designated in FIG. 3 by the reference symbols G1 to Gn, are connected in succession cyclically and periodically to a buffer store 42 which takes over the output signal of the detectors G1 to Gn, respectively connected to it, in each case at a point in time predetermined by the switch-over logic 40. The output signals registered in bit-parallel form in the buffer 42 are then converted with the aid of a parallel/-serial converter 44 into serial bit sequences which are fed via an output amplifier 46 to the signal output of the transmitting unit. This signal output may, for example, consist of a light-emitting diode which, in accordance with the bit sequence fed to the amplifier 46, generates light pulses which are received by the receiving unit comprising at the output, for example, a phototransistor, and are fed to a serial/parallel converter 48, at whose output the bit-parallel data of the individual detectors G1 to Gn are now available again in succession and may be evaluated in the conventional manner, which within the context of the present invention needs no further explanation, in order to effect speed and position control for the individual work spindles.
* (multiplexer circuit)

In the exemplary embodiment according to FIG. 4, the absolute value detectors G1 to Gn are replaced by so-called incremental detectors I1 to In. These incremental detectors comprise as rotating detector, for example, a pulse disc with two tracks offset with respect to each other, with increment marks and with a zero mark. The increment mark tracks and the zero mark of the pulse disc are scanned by sensors of the associated sensor means which delivers two out-of-phase pulse sequences and also reference pulses or zero mark signals corresponding to the zero mark. In accordance with FIG. 4, there is associated with each detector I1 to In, a circuit 50.1 to 50.n, in which there is generated for each edge of the two pulse sequences one counting pulse, respectively, in which, furthermore, on account of the phase position of the edges of the two pulse sequences, an upward or a downward counting signal is generated, and in which, finally, a resetting pulse is generated in dependence upon the reference pulse. The output signals of the circuits 50.1 to 50.n are fed to the counting input, the counting directional input or the resetting input of a respectively associated forward- /rearward counter 52.1 to 52.n. Now available again at the outputs of the counters 50.1 to 50.n in bit-parallel form are the data which correspond to the absolute angular position of the pertinent work spindle, so that each of the incremental detectors I1 to In, together with the respectively associated circuit 50.1 to 50.n and the associated counter 52.1 to 52.n again forms an absolute value detector, as designated by the reference symbols G1 to Gn in FIG. 3, with each of these absolute value detectors, to be precise, representing an absolute value angle coder. The output signals of the various "absolute value angle coders" in accordance with FIG. 4 may now be fed again via the switchover logic 40 to the circuits 42 to 46 of the transmitting unit and from there to the receiving unit 38 and the circuit 48, as was explained with reference to FIG. 3.

Figure 5:
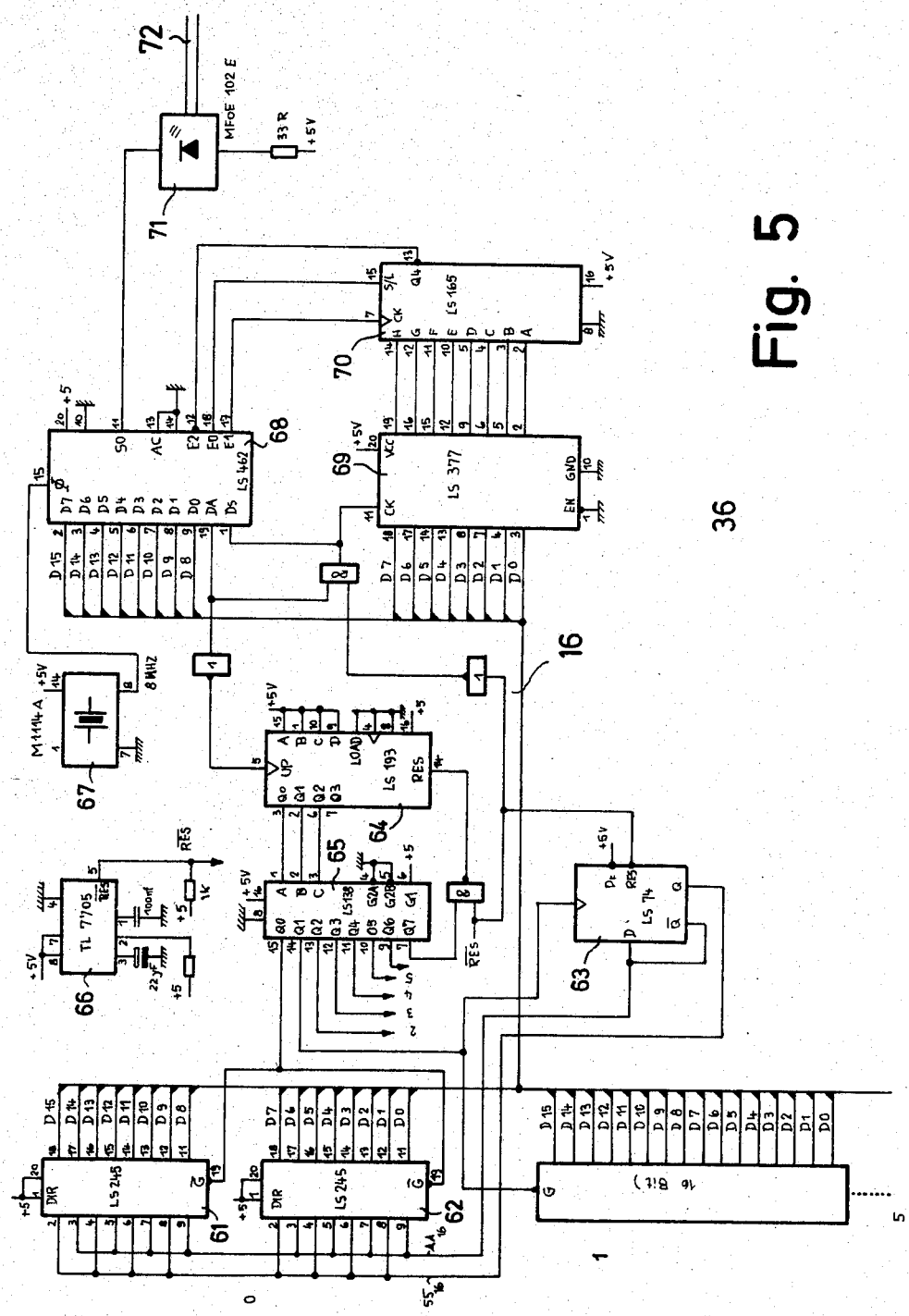
FIG. 5 is a schematic, more detailed circuit diagram of a preferred embodiment of the transmitting unit of the speed and position control devices of a multiple spindle automatic lathe according to the invention.

FIG. 5 shows, partly somewhat schematically, the essential details of a transmitting unit 36 comprising integrated circuits in accordance with the invention.

In the circuit diagram according to FIG. 5, only the essential integrated circuits are specially designated by reference symbols, while passive components such as resistors and capacitors and smaller component groups such as inverters and AND circuits whose function is unproblematic, are only represented by their conventional symbols. Also indicated in FIG. 5, insofar as required, are the various supply voltages, such as, for example, +5 V, and these data are supplemented by the designation and numbering of the individual terminals or "pins" of the integrated circuits. The same applies to the schematic circuit diagram according to FIG. 6, which shows a receiving unit comprising integrated circuits in accordance with the invention.

Figure 6:
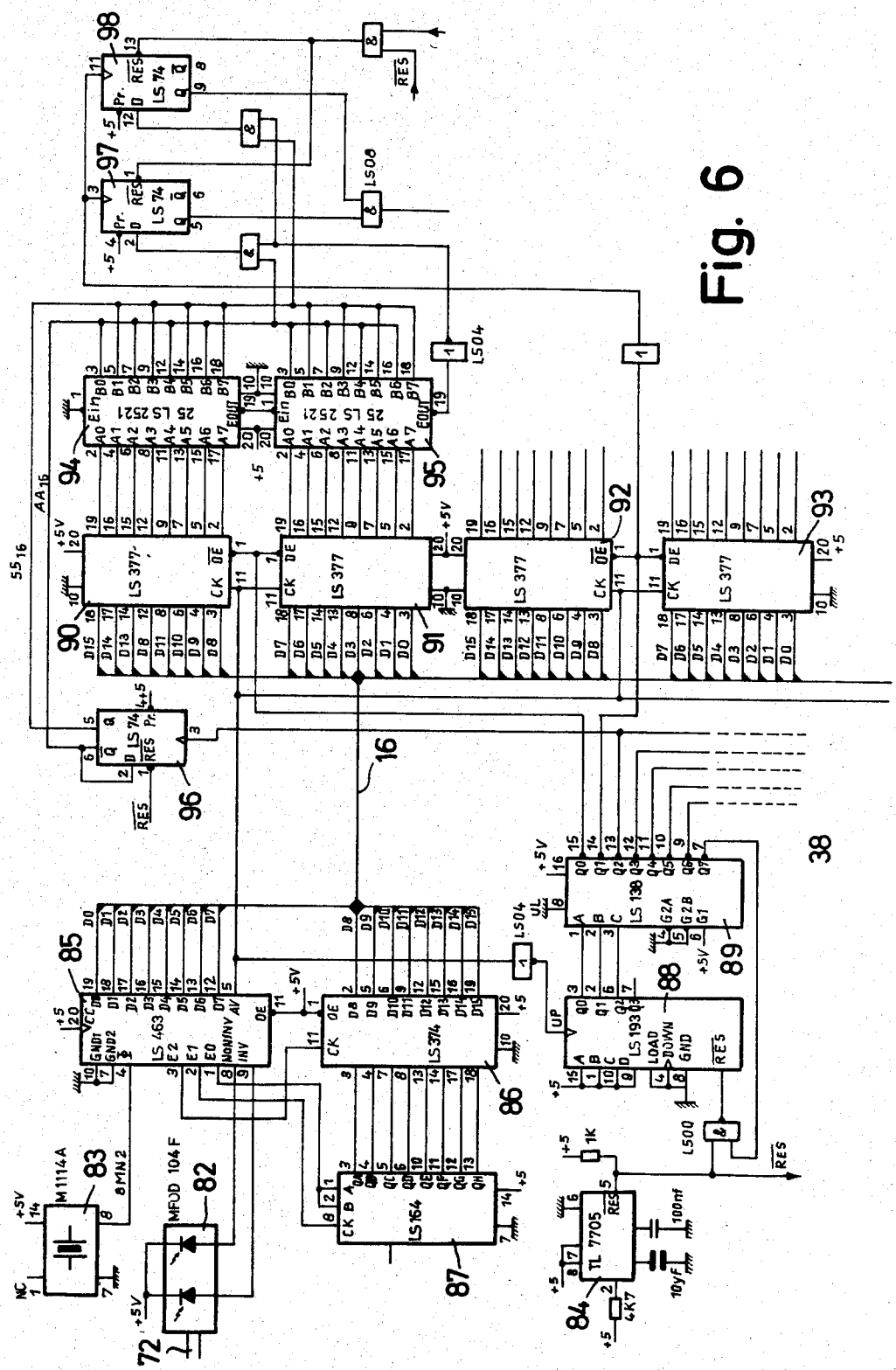
FIG. 6 is a more detailed, schematic circuit diagram of the receiving unit of the speed and position control devices of a multiple spindle automatic lathe according to the invention.

Summarized in tabular form in the following Tables I and II are the type number, the manufacturer, the designation and, insofar as required, a brief description of the functioning of the essential elements of the circuits according to FIGS. 5 and 6. The following abbreviations are used in the Tables for the manufacturers of the components: TI=Texas Instruments, MO=Motorola.

TABLE I

| Reference numeral | IC component | Designation; | Function |
|---|---|---|---|
| 61, 62 | TI-SN74LS245 | drivers; | Produce a test bit pattern dependent on state of flip-flop 63 alternative 0101 0101 0101 0101 = $5555_{16}$ 1010 1010 1010 1010 = $AAAA_{16}$ This pattern is transmitted as information by the first detector (detector 0)and enables cyclic synchronization between transmitter and receiver. |
| 63 | TI-SN74LS74 | D-flip-flop; | After each cycle its state changes from → L → O etc. |
| 64 | TI-SN74LS193 | 4bit binary counter; | Counter which after switching-on of voltage is set to "0" and is then increased by 1 after each completed transmission. Together with decoder 65 it serves to select one of "n" detectors (in this example 6 detectors). |
| 65 | TI-SN74LS138 | decoder; | Decodes the count of counter and activates one of the "n" detectors or the bit pattern generator 61, 62. |
| 66 | TI-TL7705 | voltage monitor; | Monitors the operating voltage 5 V. Generates reset signals for system standardization. |
| 67 | MO-K1114A | quartz generator; | Clock pulse generator, quartz controlled 8 MHz basic clock pulse ∅ |
| 68 | TI-SN74LS462 | transmitter; | Parallel/serial converter and coder (modulator). Driver for the LED 71. |
| 69 | TI-SN74LS377 | 8bit register; | Broadens together with the shift register 70 the width of transmitter 68 from 8 to 16 bits. |
| 70 | TI-SN74LS165 | 8bit shift register; | see 69 |
| 71 | MO-MFOE102E | transmitting diode; | Photodiode. Converts the electric pulses into light signals. |
| 72 | Honeywell | Optical fiber cable with coupling | |

TABLE II

| Reference numeral | IC component | Designation; | Function |
|---|---|---|---|
| 72 | Honeywell | Optical fiber cable | |
| 82 | MO-MFOE104F | receiver diode, | Photodiode for conversion of light signals into electric pulses |
| 83 | MO-K1114A | quartz generator; | Clock pulse generator (see transmitting unit 36, component 67) |

TABLE II-continued

| Reference numeral | IC component | Designation; | Function |
|---|---|---|---|
| 84 | TI-TL7705 | voltage monitor; | Voltage monitoring (see transmitting unit 36, component 66) |
| 85 | TI-SN74LS463 | receiver; | Serial/parallel converter and decoder (demodulator) |
| 86 | TI-SN74LS374 | 8bit register; | Together with 87 serves to broaden the word width of the receiver 85 from 8 to 16 bits |
| 87 | TI-SN74LS164 | 8bit shift register; | see 86 |
| 88 | TI-SN74LS193 | 4bit binary counter; | Pulse counting (see transmitting unit 36, component 64) |
| 89 | TI-SN74LS138 | decoder; | Decodes the count of 84 and generates a writing pulse for a (of "n") 16bit register 90 to 93 |
| 90, 91, 92, 93 | TI-SN74LS377 | 8bit register; | Coupled in pairs forming 16bit register. Here the information coming from "n" detectors is stored. Register pair i, i+1 retains the information of detector i. |
| 94, 95 | AMD-AM25LS2521 | 8bit comparators; | Compare the information transmitted for the detector "0" (this detector was replaced in the transmitter by a bit pattern generator - see transmitter description) with the agreed upon bit pattern: $5555_{16}$ o. $AAAA_{16}$, delivered by flip-flop 96. |
| 96 | TI-SN74LS74 | D-flip-flop; | After each cycle its state changes from O → L → O etc. |
| 57, 58 | TI-SN74LS74 | D-flip-flop; | If bit pattern transmitted for detector "0" coincides with expected one, o.k. message is generated, which may also be used for synchronization. These flip-flops are cancelled cyclically. |

Figure 7:
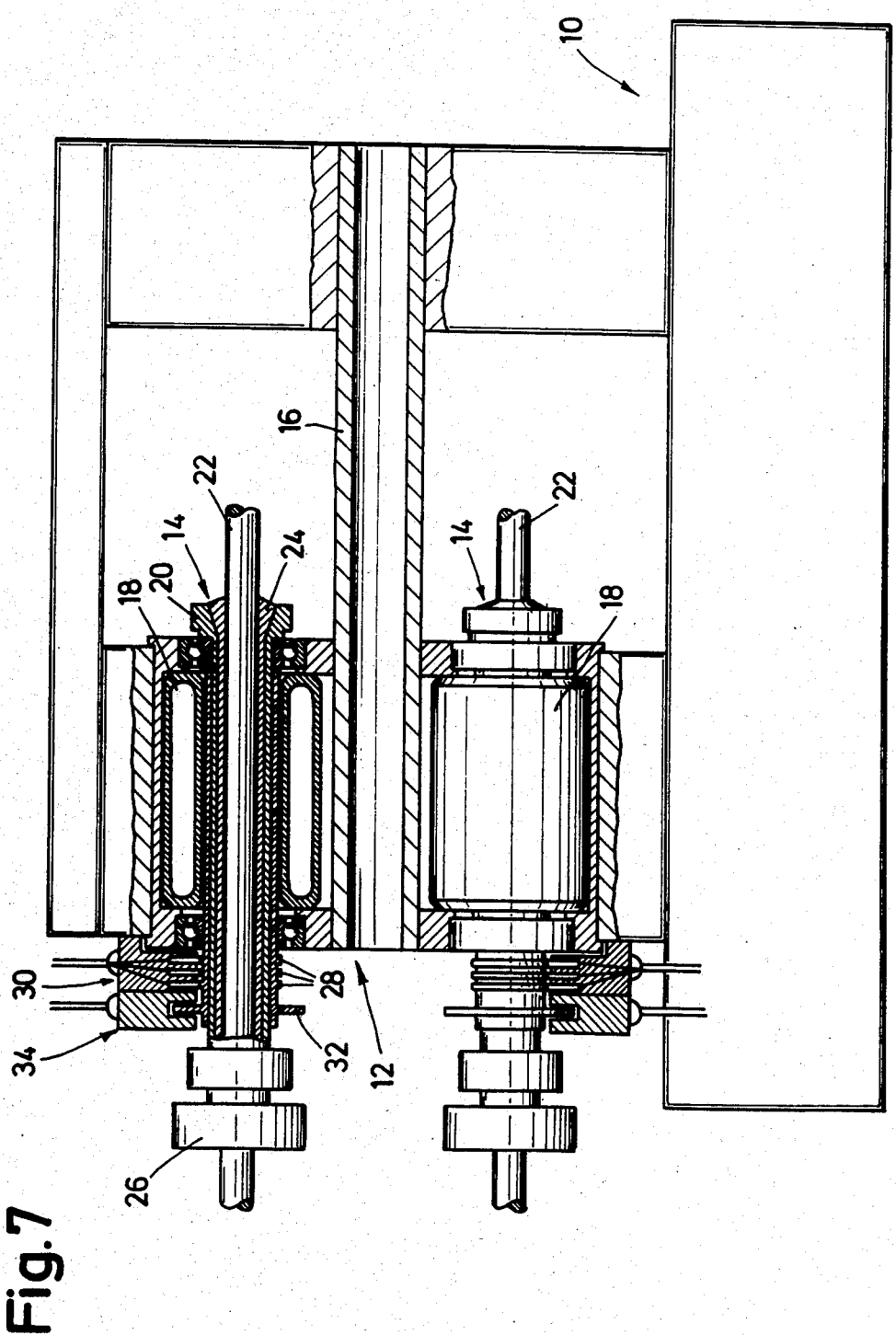
FIG. 7 shows a modified embodiment of the automatic lathe according to FIG. 1.

While in the automatic lathes according to FIGS. 1 and 2, the electric motors may be constantly fed and, consequently, controlled, also during the drum indexing procedures, FIG. 7 shows a simplified exemplary embodiment compared with the embodiment of FIG. 1. This exemplary embodiment differs from the embodiment according to FIG. 1 merely in the design of the feeding devices.

In the embodiment according to FIG. 7, the stator winding of each of the motors 18 is fed via slip rings 28 which sit on the hollow motor shaft 20 or the work spindle 14, respectively, and cooperate with brush means 30 which are fed current from an external current source (not illustrated) and which are attached to the machine frame 10. The brush means 30 are arranged at the left end face of the machine frame 10 in FIG. 7 such as to be able to cooperate in the various switch positions of the spindle drum with a set of slip rings 28 or a slip ring arrangement, respectively, and they may extend over a larger circumferential angle. The exemplary embodiment of FIG. 7 has substantial advantages over the state of the art in that on account of the electric motors individually associated with the work spindles, the optimal speed may be set for each spindle, and since each of the work spindles directly encompasses the shaft of the associated electric motor, a compact and comparatively light drum arrangement is also obtained.

Finally, it should be noted that in a multiple spindle automatic lathe according to the invention, all of the motors may be fed via the same d.c. link circuit, for example, with controlled a.c. motors, whereby the loss heat may be just as substantially reduced as in the case of a feed-back into the mains, as is, for example, possible in the reduction of the speed of d.c. motors.

What is claimed is:

1. A multiple-spindle automatic lathe comprising a rotatable spindle drum; a plurality of work spindles rotatably mounted about the interior of said spindle drum; an individually controllable electric motor associated with each of said work spindles for rotatably driving the same; said motors being supportably mounted in adjacent relationship in said spindle drum; stationary frame means for supportably mounting said spindle drum; means for indexing said spindle drum into a plurality of positions corresponding to the number of said work spindles; each of said work spindles comprising the shaft of its associated electric motor; said spindle drum having a supporting shaft end rotatably work spindles comprising the shaft of its associated electric motor; said spindle drum having a supporting shaft end rotatably mounted on said stationary frame means; current conducting slip rings mounted on said spindle drum shaft; current-conducting means interconnecting said slip rings and said motors; current-conducting brush means mounted on said stationary frame means for communication with an electrical supply for engaging said slip rings and energizing said motors by means of such electrical supply; control means for controlling the speed of each electric motor and the angular disposition of its associated shaft; said control means comprising angular position indicator means rotating synchronously with each of said spindles, and stationary signal-generating sensor means sensitive to the speed and angular disposition of said angular position indicator means.

2. A multiple-spindle automatic lathe comprising a rotatable spindle drum; a plurality of work spindles rotatably mounted about the interior of said spindle drum; and individually controllable electric motor associated with each of said work spindles for rotatably driving the same; said motors being supportably mounted in said spindle drum; stationary frame means for supportably mounting said spindle drum; means for indexing said spindle drum into a plurality of positions corresponding to the number of said work spindles; each of said work spindles comprising the shaft of its associated electric motor; stationary current supply means; means for separately supplying electrically energizing currents from said supply means to each of said plurality of motors; control means for control of currents to said current supply means; said control means including rotary angular position indicator means and sensor means for developing electrical signals corresponding to the respective angular position of each of said work spindles to accurately control the respective angular position of each of said work spindles.

3. The multiple-spindle automatic lathe of claim 1 or 2 in which the sensor means are located at positions on the stationary frame means which correspond to the positions into which the spindle drum is indexed.

4. The multiple-spindle automatic lathe of claim 1 or 2 in which the sensor means are arranged on the spindle drum, and signal transmission means for conveying signals of the sensor means are arranged on the shaft of the spindle drum and comprise a signal transmitting unit rotating with the spindle drum, and said transmitting unit is in combination with a signal receiving unit attached to the frame means for evaluating such conveyed signals.

5. The multiple-spindle automatic lathe of claim 4 in which the transmitting unit is arranged at one end of the shaft of the spindle drum and comprises a signal output located on the axis of the spindle drum, and the receiving unit comprises a spaced, unconnected, signal-receiving unit.

6. The multiple-spindle automatic lathe of claim 5 in which the signal transmitting unit comprises an optical light-transmitting unit, and the receiving unit comprises an optical light-receiving unit.

7. The multiple-spindle automatic lathe of claim 4 in which said signal transmitting unit comprises a parallel/serial converter and said receiving unit comprises a serial/parallel converter.

8. The multiple-spindle automatic lathe according to claim 1 or 2 in which the position indicator means comprise a rotating coding disc having a plurality of sensible tracks and said sensor means comprises a plurality of sensors associated with the individual tracks of the coding disc.

9. The multiple-spindle automatic lathe of claim 1 or 2 in which the rotary position indicator means comprises a rotating pulse disc having at least two increment mark tracks offset with respect to one another and a zero reference mark, and said sensor means comprise sensors for detecting the increment marks and the zero mark, and a pulse-shaping circuit for identifying the forward or rearward running of the increment mark tracks, for detecting the zero mark and for generating a corresponding output pulse sequence, a directional signal and a resetting signal; said sensor means also comprising a forward/rearward counter for counting the output pulses of the pulse-shaping circuit having a counting direction determined by the directional signal and which may be reset to the zero count in dependence upon the zero mark signal.

10. The multiple-spindle automatic lathe according to claim 3 in which the signal-transmitting unit comprises a wavelength multiplexer whereby the data may be emitted simultaneously via a light guide through several data channels independent of one another, and in which there is associated with the receiving unit a corresponding wavelength demultiplexer for fanning out the received data sequences into several channels.

11. The multiple-spindle automatic lathe of claim 2 in which brush means are associated with the electric motors as stationary current supply means, and said means for separately supplying electrically energizing currents include slip ring means.

12. The multiple-spindle automatic lathe of claim 11 in which the brush means are attached at positions on the machine frame corresponding to the indexing positions of the spindle drum, and there is provided for each electric motor an associated slip ring means rotating with the pertinent work spindle.

* * * * *